United States Patent
Diederich et al.

(10) Patent No.: US 9,626,111 B1
(45) Date of Patent: Apr. 18, 2017

(54) SEQUENTIAL WRITE OF RANDOM WORKLOAD IN MIRRORED PERFORMANCE POOL ENVIRONMENTS

(71) Applicant: International Business Machines Corporation, Armonk, NY (US)

(72) Inventors: Michael Diederich, Mainz (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/990,133

(22) Filed: Jan. 7, 2016

(51) Int. Cl.
G06F 3/06 (2006.01)

(52) U.S. Cl.
CPC .......... G06F 3/0611 (2013.01); G06F 3/065 (2013.01); G06F 3/0638 (2013.01); G06F 3/0685 (2013.01)

(58) Field of Classification Search
CPC ...... G06F 3/0611; G06F 3/0638; G06F 3/065; G06F 3/0685
See application file for complete search history.

(56) References Cited

U.S. PATENT DOCUMENTS

| | | | |
|---|---|---|---|
| 5,557,770 A | 9/1996 | Bhide et al. | |
| 6,516,380 B2 | 2/2003 | Kenchammana-Hoskote et al. | |
| 6,728,898 B2 * | 4/2004 | Tremblay | G06F 11/2082 714/5.11 |
| 8,074,017 B2 | 12/2011 | Cavallo | |
| 8,239,645 B1 | 8/2012 | Sade et al. | |
| 8,484,415 B2 | 7/2013 | Cho | |
| 8,549,222 B1 | 10/2013 | Kleiman et al. | |
| 8,589,723 B2 | 11/2013 | Kumar et al. | |
| 8,700,949 B2 | 4/2014 | Eleftheriou et al. | |
| 8,909,859 B2 | 12/2014 | Bandic et al. | |

(Continued)

FOREIGN PATENT DOCUMENTS

| | | |
|---|---|---|
| EP | 0617358 A1 | 9/1994 |
| EP | 1898309 A2 | 3/2008 |
| WO | 2005066954 A1 | 7/2005 |

OTHER PUBLICATIONS

"Deploying Hybrid Storage Pools with Oracle Flash Technology and the Oracle Solaris ZFS File System", Sun Oracle, An Oracle White Paper; Aug. 2011.

*Primary Examiner* — Aracelis Ruiz
(74) *Attorney, Agent, or Firm* — Brown & Michaels, PC; John R. Pivnichny

(57) ABSTRACT

A mirrored storage system comprising a system controller coupled to a first storage system comprising a primary controller and a first storage and to a second storage system comprising a secondary controller and a second storage. The second storage contains an image of data stored in the first storage. The system controller receives data to be written to storage and sends the data to the primary controller of the first storage system and to the secondary controller of the second storage system. The system controller instructs the primary controller to write the data to the first storage of the first storage system in an ordered manner; and instructs the secondary controller to write the data sequentially to a data area on the second storage of the second storage system. Writing the data sequentially to the second storage improves the write performance.

15 Claims, 6 Drawing Sheets

(56) References Cited

U.S. PATENT DOCUMENTS

| | | | |
|---|---|---|---|
| 2003/0135783 A1* | 7/2003 | Martin | G06F 11/1471 |
| | | | 714/13 |
| 2009/0204758 A1 | 8/2009 | Luning | |
| 2010/0146205 A1* | 6/2010 | Baum | G06F 12/0804 |
| | | | 711/113 |
| 2012/0239869 A1 | 9/2012 | Chiueh et al. | |
| 2012/0303577 A1* | 11/2012 | Calder | G06F 11/2074 |
| | | | 707/613 |
| 2013/0054873 A1* | 2/2013 | Belluomini | G06F 12/0866 |
| | | | 711/103 |
| 2014/0129765 A1 | 5/2014 | Cho | |
| 2014/0250281 A1* | 9/2014 | Rao | G06F 12/0223 |
| | | | 711/156 |
| 2016/0124814 A1* | 5/2016 | Joseph | G06F 11/1464 |
| | | | 714/19 |

* cited by examiner

SEQUENTIAL WRITE OF RANDOM WORKLOAD IN MIRRORED PERFORMANCE POOL ENVIRONMENTS

BACKGROUND

The present invention relates to data mirroring in high available storage solutions, and more specifically to sequential write of random workload in mirroring performance pool environments.

A spinning hard disk drive uses one or more spinning surfaces on which concentric tracks of data are written and read by physical read/write heads. The heads must be moved radially inward and outward to read data on different tracks, and within a track the head has to wait for the desired data location to move under the head before it can be written or read. This introduces a time delay into the read or write process.

If data is physically stored sequentially on the disk, the sequential read time may be minimized because the head does not need to move and there is no waiting for the disk to move the head to the data. However, if the data is not sequential when it is written (which is usually the case) the read/write time is greatly increased because of the necessity to move the head and wait for the particular data location needed to move into position. If the data is written as it comes in random order, the write time is minimized, but if the data is to be read out sequentially the read process is slowed substantially because of the necessity to move the head and wait for the particular data location needed to move into position.

In conventional mirrored storage setups, a first storage system stores data and the same data is simultaneously written to a second storage system, which functions as "mirror" or image copy of the data on the first storage system. The mirrored data is available for backup and/or disaster recovery.

For both the first storage system and the second storage system, the disk controller of the system writes the data in an "ordered" manner—the term "ordered manner" being defined as keeping consecutive data blocks physically adjacent to each other so that sequential read time is minimized. In order to maintain the ordered arrangement of the data, when an update is made to an already written block, an actuator and read/write head must move to the original block position and rewrite the block to apply the update. While keeping the data in an ordered manner minimized sequential read time, writing the random data to the disk in an ordered manner consumes a lot of write time.

When the data is written in a mirrored system, the final write acknowledgement has to be provided from both of the systems before the next write request can proceed, and therefore there is a lag time between the two systems. Conventional setups therefore work most efficiently if the two storage systems implement two similar technologies, because if the second (mirror) storage system writes slower than the first (primary) storage system, the overall write performance is limited to the speed of the slower of the two systems. However, for reasons of cost, it is sometimes desirable to use a high-cost but very fast storage device (for example, a solid state drive (SSD)) for primary storage, and a low-cost but slower storage device (for example, a spinning hard disk drive (HDD)) for the backup or mirror drive.

If the high-speed SSD drive has to wait for the mirrored data to be written to the slower HDD, the advantage of the higher speed of the SSD can be lost.

Alternatively, instead of writing simultaneously to both storage devices, data may written first to a high-speed storage system such as an SSD. Once the data is on the SSD, the system is notified of the write completion and the data is copied from the SSD to a second, slower storage system such as an HDD. The disadvantage to writing incoming data in this manner is that if something happens which interrupts or prevents the later copying of the data to the mirror, the second storage system will have different (older) data stored than the primary drive it is supposed to be mirroring.

SUMMARY

According to one embodiment of the present invention a method of writing data to a mirrored storage system is disclosed. The mirrored storage system comprising a first storage system comprising a primary controller and a first storage and a second storage system comprising a secondary controller and a second storage, wherein the second storage contains an image of the data stored in the first storage. The method comprising the steps of: a system controller receiving data to be written to storage; the system controller sending the data to the primary controller of the first storage system and to the secondary controller of the second storage system; the system controller instructing the primary controller to write the data to the first storage of the first storage system in an ordered manner; and the system controller instructing the secondary controller to write the data sequentially to a data area on the second storage of the second storage system. An advantage of the method of the present invention is that the second controller writes the data sequentially improves the write performance for the secondary device, for example by a factor of ten, over attempting to write the data in an ordered manner, allowing a mixture of a high performance primary storage system with a low performance secondary storage system for backup purposes without sacrificing performance.

According to another embodiment of the present invention a computer program product for writing data to a mirrored storage system is disclosed. The mirrored storage system comprising a system controller comprising at least one processor, one or more memories, one or more computer readable storage media, a first storage system comprising a primary controller and a first storage and a second storage system comprising a secondary controller and a second storage, wherein the second storage contains an image of the data stored in the first storage, the computer program product comprising a computer readable storage medium having program instructions embodied therewith. The program instructions executable by the system controller to perform a method comprising: sending, by the system controller, the data to the primary controller of the first storage system and to the secondary controller of the second storage system; instructing, by the system controller, the primary controller to write the data to the first storage of the first storage system in an ordered manner; and instructing, by the system controller, the secondary controller to write the data sequentially to a data area on the second storage of the second storage system. An advantage of the computer program product of the present invention is that the second controller writes the data sequentially improves the write performance for the secondary device, for example by a factor of ten, over attempting to write the data in an ordered manner, allowing a mixture of a high performance primary storage system with a low performance secondary storage system for backup purposes without sacrificing performance.

According to another embodiment of the present invention a computer system for writing data to a mirrored storage system is disclosed. The mirrored storage system comprising a system controller comprising a computer comprising at least one processor, one or more memories, one or more computer readable storage media having program instructions, a first storage system comprising a primary controller and a first storage and a second storage system comprising a secondary controller and a second storage, wherein the second storage contains an image of the data stored in the first storage. The program instructions of the computer system executable by the computer comprising: sending, by the system controller, the data to the primary controller of the first storage system and to the secondary controller of the second storage system; instructing, by the system controller, the primary controller to write the data to the first storage of the first storage system in an ordered manner; and instructing, by the system controller, the secondary controller to write the data sequentially to a data area on the second storage of the second storage system. An advantage of the computer system of the present invention is that the second controller writes the data sequentially improves the write performance for the secondary device, for example by a factor of ten, over attempting to write the data in an ordered manner, allowing a mixture of a high performance primary storage system with a low performance secondary storage system for backup purposes without sacrificing performance.

DETAILED DESCRIPTION

In an illustrative embodiment, a high speed primary storage system stores data which arrives in random order, and the same data is simultaneously written to a secondary, slower storage system or disk for mirrored storage. Through the system of the invention, the high performance primary storage system may be mixed with a low performance secondary storage system for backup purposes without sacrificing performance as the slower drive forces the faster drive to wait for it to write the data. By mixing a high performance storage system and a low performance storage system together, the cost of the storage system is decreased. For example, the present invention allows a storage system which includes 'Flash' solid state storage to be paired with 'SATA' hard disk drive storage without impacting write performance or making additional hardware requirements to boost the low performance storage system.

In an illustrative embodiment of the present invention, the present invention uses a controller solution implemented by a system controller coupled to a first controller on a primary side and a second controller on a second side. The second controller stores the data onto the disk sequentially as it comes into the controller, without taking the time to order it. Writing the data sequentially improves the write performance for the secondary device, for example by a factor of ten, over attempting to write the data in an ordered manner. It should be noted that while the write performance is increased, the read performance is reduced if it were necessary to read out the sequentially written data. However, since the sequentially written data will only be kept in that form temporarily, and it is only necessary to read the secondary device in the case of a disaster, a lower read performance is acceptable during the period of time before the data is reordered into the mirror as noted below.

In an illustrative embodiment of the present invention, during periods of low processing, the system of the present invention reads the sequentially written data and reorganizes it into an ordered manner to optimize the read performance.

Figure 1:
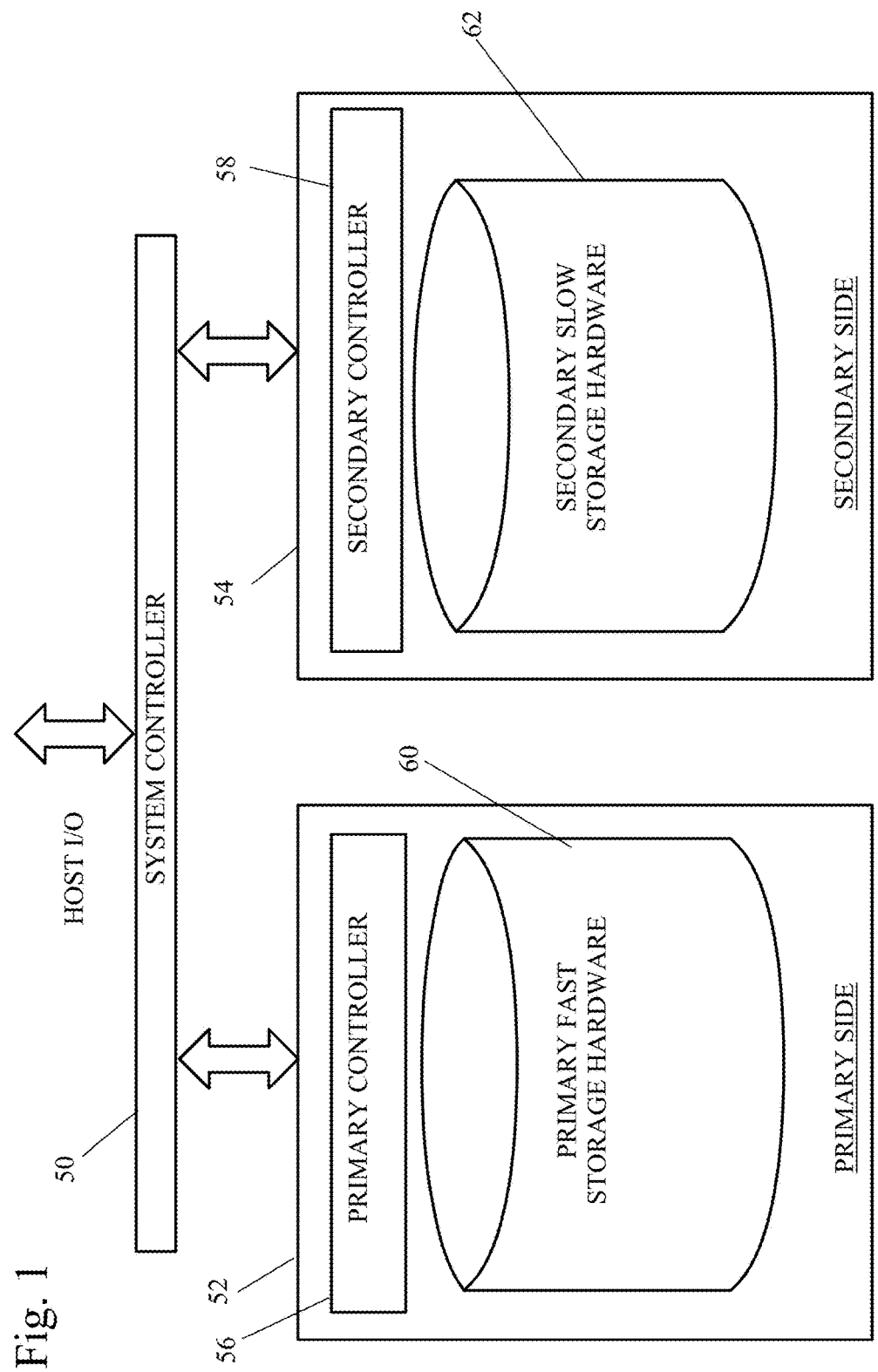
FIG. 1 shows a schematic of a mirror storage solution of an illustrative embodiment of the present invention.

FIG. 1 shows a hybrid mirror storage system of the present invention. The storage system of the present invention may be for a multi-level RAID architecture. A first storage system 52 is present on a primary side and a second storage system 54 is present on a secondary side. Data is replicated from the primary side to the secondary side. A system controller 50 controls both the first storage system 52 and the second storage 54 system through controllers 56, 58 in both the first and second storage systems 52, 54.

A primary controller 56 of the first storage system 52 stores an incoming stream of data to preexisting groups of files in primary fast storage 60 in an ordered manner. The files on the first storage system 52 are to be mirrored to secondary slow storage 62 on the second storage system 54.

Simultaneous with primary controller 56 writing the data in an ordered manner to fast storage 60, secondary controller 58 writes the same data to a secondary storage 62 sequentially (e.g. the order in which the data is received by the controllers 56 and 58). Since the data is written in a sequential manner to the second storage 62, the write performance is improved, for example by a factor of 10. Due to the write performance improvement, it is possible to use slower HDDs as secondary storage 62 and still have the secondary disk controller 58 keep up with the data flow so that there is no slowing of the data stream to accommodate the slower performance of secondary storage 62. In a preferred embodiment, as the data is written sequentially to the second storage 62, the same data as found already present in the preexisting group of files is deleted and the position is marked.

Figure 2:
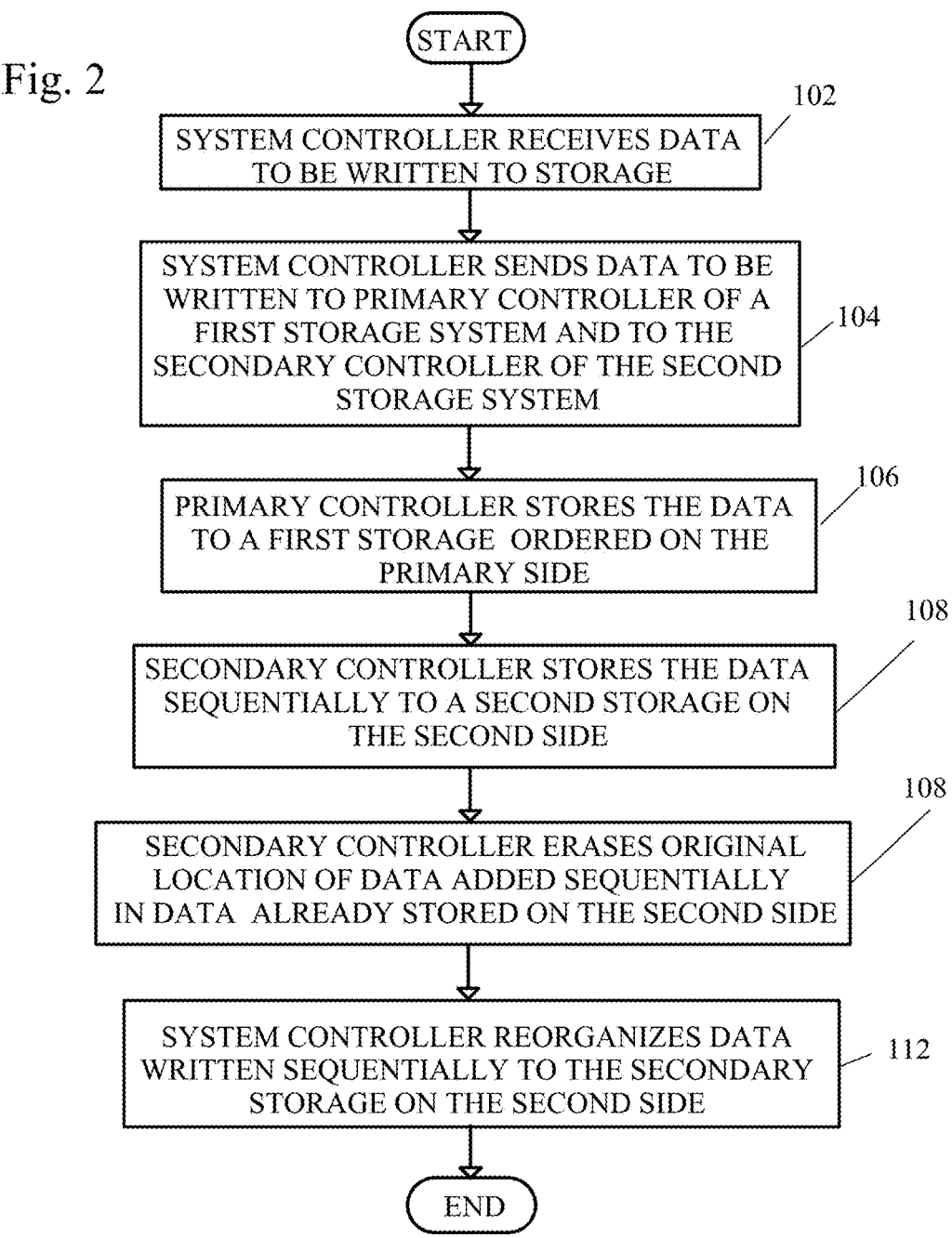
FIG. 2 shows a flow diagram of a method of writing data to a storage system.

FIG. 2 shows a flow diagram of a method of writing data to a mirrored storage system.

A system controller receives data to be written to storage (step 102).

The data is sent by the system controller to primary controller of a first storage system and also to the secondary controller of the second storage system (step 104).

Figure 3:
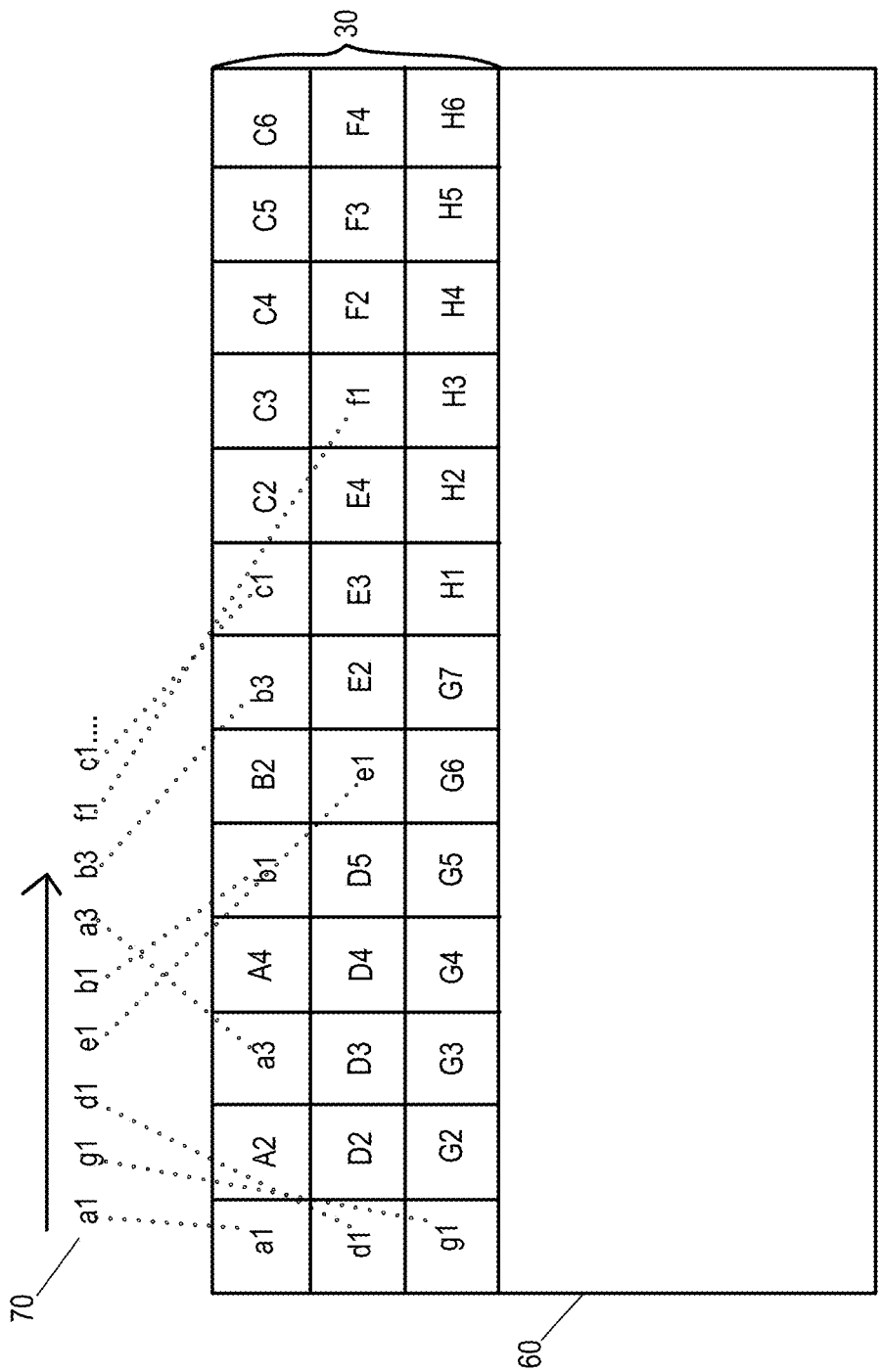
FIG. 3 shows a schematic of how files are stored by the primary storage system.

The primary controller, as instructed by the system controller, stores the data to a first storage in an ordered manner (step 106). For example, as shown in FIG. 3, an incoming stream of blocks 70 in a random order are written to preexisting blocks of files 30. The data blocks of files may be in a physical order that differs from the order in which the data were received. The placement of the lowercase letters in the files indicates where the new data is to be written within the blocks of storage in the primary storage 60. For example, if the stream of data records 70 is "a1g1d1e1b1a3b3f1c1" and the files are ordered "A, B, C, D, E, F, G, H", record "a1" is stored in order in file A block 1, file "g1" is stored in file G block 1, record "a3" is stored in file A block 3, etc. . . . . The result is an overall multiple file data store on primary storage 60 which is stored in an ordered manner, so that reading the blocks in sequential order (a1, a2, a3, b1, b2 . . . h6) will retrieve the data in minimum read time. It will be understood that while the method is described in terms of data being stored in data blocks in one file for simplicity of explanation, as a practical matter the storage 60 and 62 will contain many files and the incoming data may be written to data blocks in different files within the teachings of the invention.

As the new data is received, secondary storage 62 contains preexisting blocks of data forming a plurality of files 40 which is the mirror image of the files 30 on primary storage 60 before the file was updated. If the secondary controller 54 attempted to duplicate the ordered writing of the data 70 into the plurality of files 40 which is being done by the primary controller 52 into primary storage 60, it would not be able to keep up with the data flow, and the system controller 50 would have to interrupt the data flow to allow the secondary controller 54 to catch up. Instead, the secondary controller 54 stores the data 70 on secondary storage 62 in a sequential way as the data is received, as instructed by the system controller (step 108).

Figure 4:
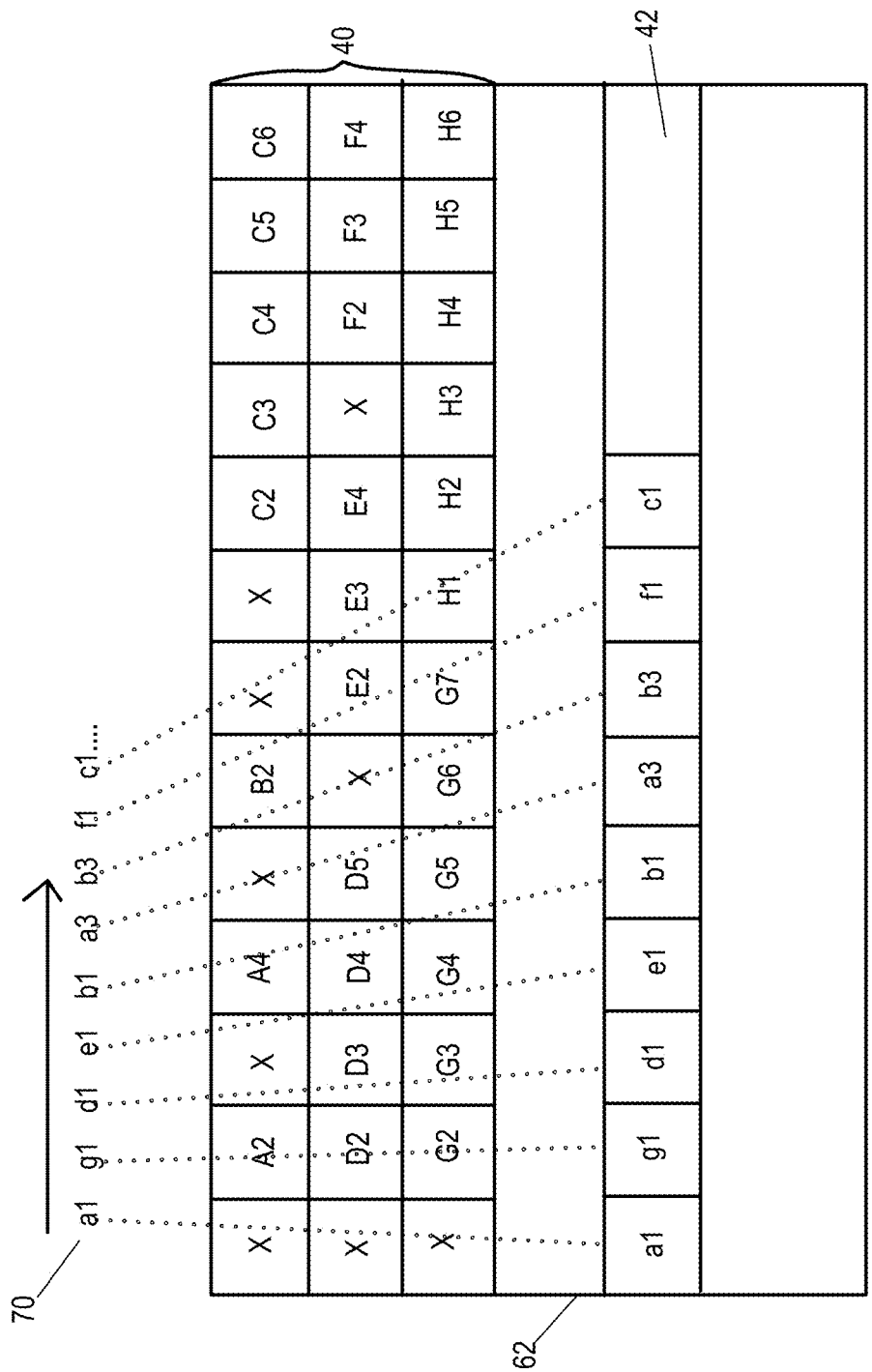
FIG. 4 shows a schematic of how files are stored by the secondary storage system.
Figure 6:
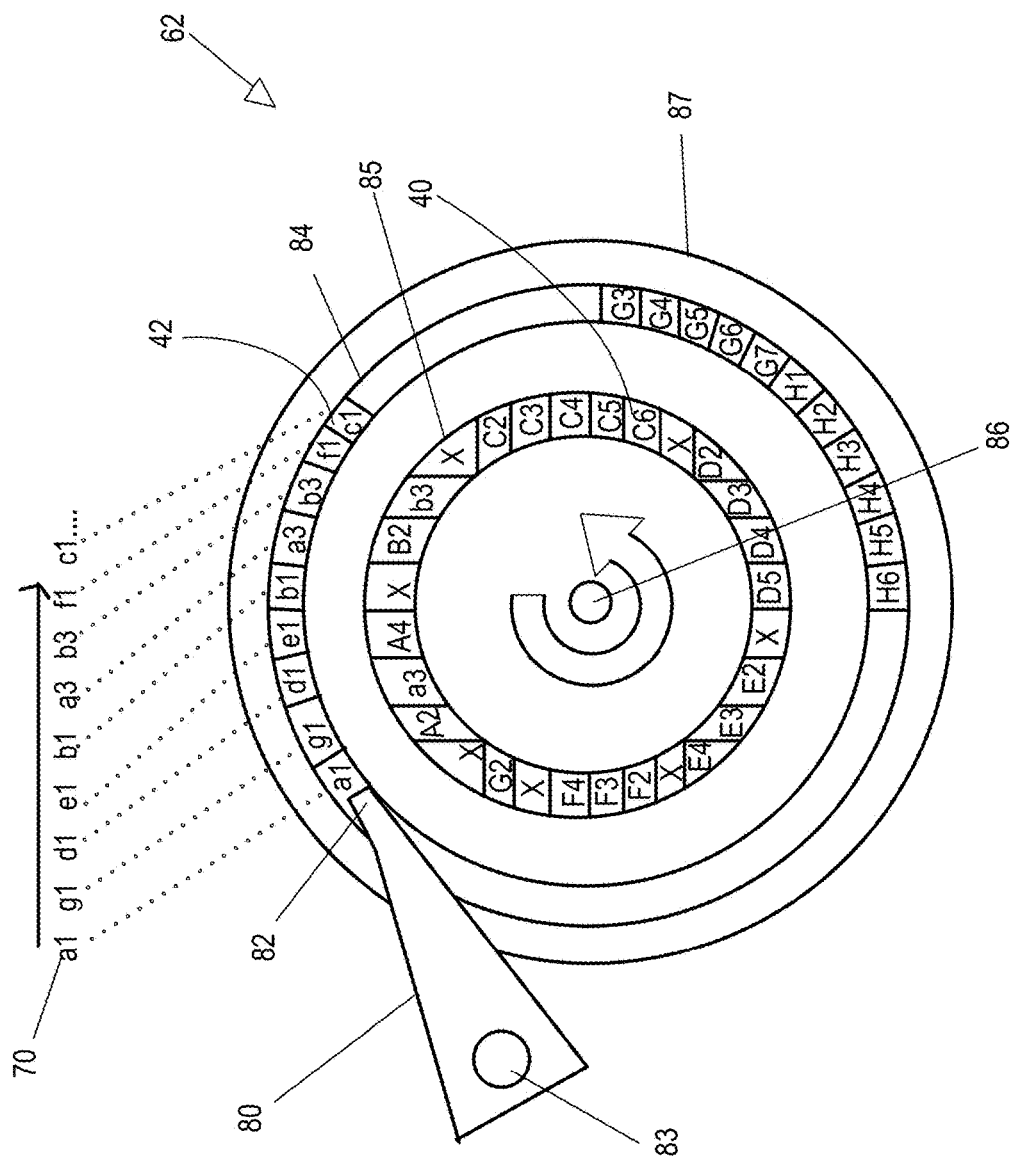
FIG. 6 shows a schematic of a secondary storage hardware writing data sequentially.

For example, as shown in FIGS. 4 and 6, the incoming stream of data records 70 "a1g1d1e1b1a3b3f1c1" is written to a data area 42 on the second storage 62 exactly in the order in which it is received. This sequential writing can be done quickly, so the secondary controller 54 does not need to stop the incoming stream of data 70, and the data can be stored sequentially on the slower secondary storage 62 as quickly as the much faster primary storage 60 can store the data in an ordered manner. The data area 42 into which the incoming stream of data 70 is written is preferably located in the free space within the second storage 62 and does not interfere or rewrite blocks in the mirror file 40 which is already present on secondary storage 62.

Referring to FIG. 6, a disk 87 with tracks 84, 85 spins/rotates on a spindle 86 in the direction shown by the arrow. As an incoming data 70 is steamed, an actuator arm 80 moveable through an actuator 83 writes the incoming stream of data through a head 82 to track 84 in a sequential manner. The head 82 of the actuator arm 80 also performs a read function.

The secondary controller 54 erases an original location of the data in the preexisting blocks of data being written sequentially and tags or marks the location, indicated by the "X", in the data already stored on the second side (step 110).

Figure 5:
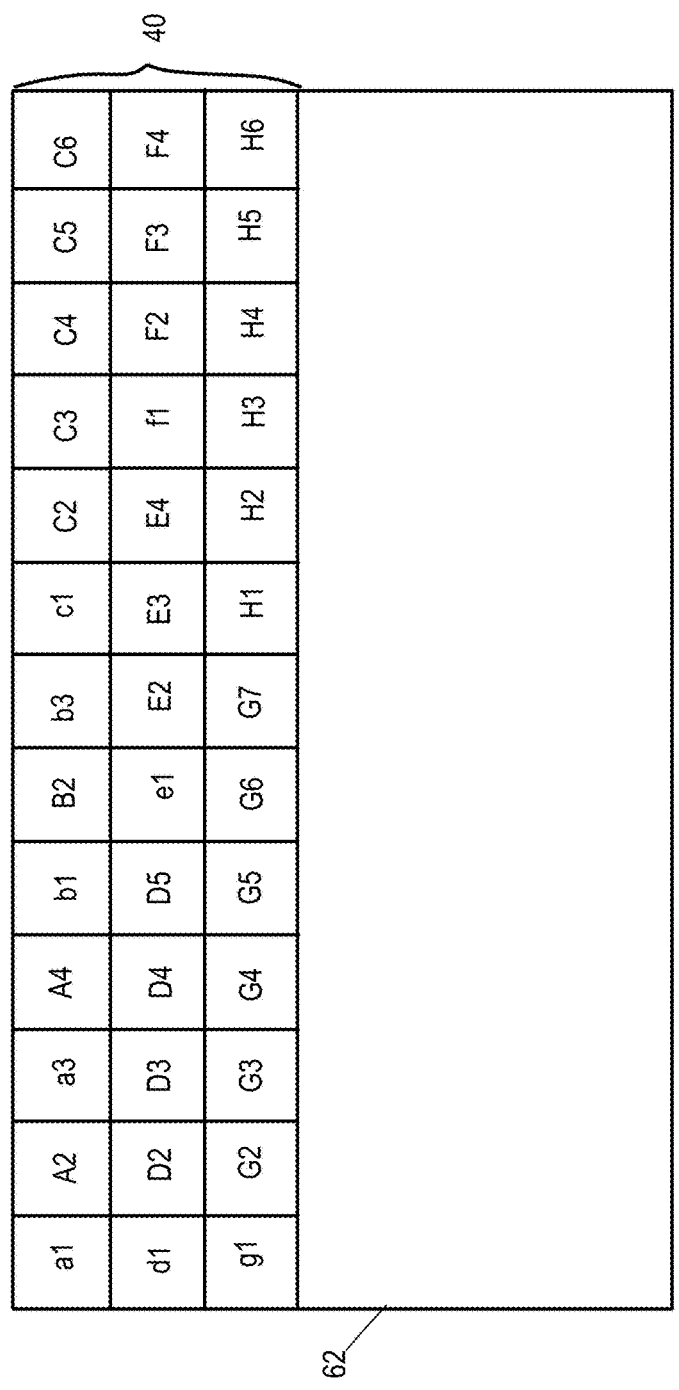
FIG. 5 shows a schematic of reorganization of files written to the secondary storage system.

FIG. 5 shows a schematic of reorganization of files written to the secondary storage system. It should be noted that the lowercase letters with numbers represent the new data being written and the uppercase letters indicate data already written to the storage 62.

When the system is less loaded, and time permits, the system controller 50 or secondary controller 54 optionally reads the data in the data area 42 sequentially, and writes the data in an ordered manner to the related data blocks in the mirror of file 40 on the secondary storage 62 (step 112) and the method ends. While this reorganization and rewriting the data in the data area does take time, it can be delayed until the controller is not needed to write new data, so that the slower speed of the secondary storage does not matter. If new data does arrive while the reorganization is in progress, it can be written sequentially at the end of the data in the data area 42, and will be reorganized into the mirror file 40 in turn.

Instead of processing the data in data area 42 sequentially in the order received, as described above, the order of processing the data in the data area 42 may be determined by a heat map of the files already stored in the first storage system on the primary side to determine which files have a high probability of being read if a failure were to occur.

Once the data in the data area 42 has all been reorganized into the mirror file 40, the data area 42 written sequentially can be deleted or overwritten.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of writing data to a mirrored storage system comprising a first storage system comprising a primary controller and a first storage and a second storage system comprising a secondary controller and a second storage, wherein the second storage contains an image of data stored in the first storage, the method comprising the steps of:
    a system controller receiving data to be written to storage;
    the system controller sending the data to the primary controller of the first storage system and to the secondary controller of the second storage system;
    the system controller instructing the primary controller to write the data to the first storage of the first storage system in an ordered manner;
    the system controller instructing the secondary controller to write the data sequentially to a data area on the second storage of the second storage system;
    the system controller reorganizing the sequentially written data in the data area of the second storage system into the image on the second storage; and
    the system controller instructing the secondary controller to erase a location of the data being written sequentially and mark the erased location.

2. The method of claim 1, wherein the first storage system is faster than the second storage system.

3. The method of claim 1, wherein the step of the system controller reorganizing the sequentially written data of the second storage system takes place when processing of the system controller is below a predetermined level.

4. The method of claim 1, wherein the step of the system controller reorganizing the sequentially written data of the second storage system further comprises ordering the sequentially written data by associating and rewriting the data to blocks of data already present in the image on the second storage system.

5. The method of claim 1, further comprising creating a heat map of the data which has a high probability of being read, such that the sequentially written data of the second storage system with the high probability of being read is ordered first by associating and rewriting the sequentially written data to blocks of data already present in the second storage system.

6. A computer program product for writing data to a mirrored storage system comprising a system controller comprising at least one processor, one or more memories, one or more computer readable storage media, a first storage system comprising a primary controller and a first storage and a second storage system comprising a secondary controller and a second storage, wherein the second storage contains an image of data stored in the first storage, the computer program product comprising a non-transitory machine-readable storage medium having program instructions embodied therewith, the program instructions executable by the system controller to perform a method comprising:
    sending, by the system controller, the data to the primary controller of the first storage system and to the secondary controller of the second storage system;
    instructing, by the system controller, the primary controller to write the data to the first storage of the first storage system in an ordered manner;
    instructing, by the system controller, the secondary controller to write the data sequentially to a data area on the second storage of the second storage system;

reorganizing, by the system controller, the sequentially written data in the data area of the second storage system into the image on the second storage; and the system controller instructing the secondary controller to erase a location of the data being written sequentially and mark the erased location.

7. The computer program product of claim 6, wherein the first storage system is faster than the second storage system.

8. The computer program product of claim 6, wherein the program instructions of reorganizing, by the system controller, the sequentially written data of the second storage system takes place when processing of the system controller is below a predetermined level.

9. The computer program product of claim 6, wherein the program instructions of reorganizing, by the system controller, the sequentially written data of the second storage system further comprises ordering the sequentially written data by associating and rewriting the data to blocks of data already present in the image on the second storage system.

10. The computer program product of claim 6, further comprising creating, by the system controller, a heat map of the data which has a high probability of being read, such that the sequentially written data of the second storage system with the high probability of being read is ordered first by associating and rewriting the sequentially written data to blocks of data already present in the second storage system.

11. A computer system for writing data to a mirrored storage system comprising a system controller comprising a computer comprising at least one processor, one or more memories, one or more computer readable storage media having program instructions, a first storage system comprising a primary controller and a first storage and a second storage system comprising a secondary controller and a second storage, wherein the second storage contains an image of data stored in the first storage, the program instructions of the computer system executable by the computer comprising:

sending, by the system controller, the data to the primary controller of the first storage system and to the secondary controller of the second storage system;

instructing, by the system controller, the primary controller to write the data to the first storage of the first storage system in an ordered manner;

instructing, by the system controller, the secondary controller to write the data sequentially to a data area on the second storage of the second storage system;

reorganizing, by the system controller, the sequentially written data in the data area of the second storage system into the image on the second storage; and the system controller instructing the secondary controller to erase a location of the data being written sequentially and mark the erased location.

12. The computer system of claim 11, wherein the first storage system is faster than the second storage system.

13. The computer system of claim 11, wherein the program instructions of reorganizing, by the system controller, the sequentially written data of the second storage system takes place when processing of the system controller is below a predetermined level.

14. The computer system of claim 11, wherein the program instructions of reorganizing, by the system controller, the sequentially written data of the second storage system further comprises ordering the sequentially written data by associating and rewriting the data to blocks of data already present in the image on the second storage system.

15. The computer system of claim 11, further comprising creating, by the system controller, a heat map of the data which has a high probability of being read, such that the sequentially written data of the second storage system with the high probability of being read is ordered first by associating and rewriting the sequentially written data to blocks of data already present in the second storage system.

* * * * *